United States Patent [19]
Sycara et al.

[11] Patent Number: 5,574,640
[45] Date of Patent: Nov. 12, 1996

[54] CASE-BASED SCHEDULING METHOD FOR CREATING A SCHEDULE

[75] Inventors: Katia P. Sycara, Pittsburgh, Pa.; Kazuo Miyashita, Osaka, Japan

[73] Assignees: Carnegie Mellon University, Pittsburgh, Pa.; Matsushita Electric Industrial Co. Ltd., Osaka, Japan

[21] Appl. No.: 351,547

[22] Filed: Dec. 7, 1994

Related U.S. Application Data

[63] Continuation of Ser. No. 37,080, Mar. 25, 1993, abandoned.
[51] Int. Cl.⁶ ................................................. G06F 15/22
[52] U.S. Cl. ................................ 364/401 R; 364/DIG. 1
[58] Field of Search ............................................... 364/401

[56] References Cited

U.S. PATENT DOCUMENTS

| | | | |
|---|---|---|---|
| 4,896,269 | 1/1990 | Tong | 364/468 |
| 5,133,045 | 7/1992 | Gaither et al. | 395/51 |
| 5,148,370 | 9/1992 | Litt et al. | 364/468 |
| 5,202,993 | 4/1993 | Tarsy et al. | 395/700 |
| 5,212,791 | 5/1993 | Damian et al. | 395/650 |
| 5,270,920 | 12/1993 | Pearse et al. | 364/401 |
| 5,301,260 | 4/1994 | Miyashita | 395/54 |
| 5,315,509 | 5/1994 | Natarajan | 364/401 |

OTHER PUBLICATIONS

Ow et al.; Reactive Plan Revision; Proceedings of Seventh American Association of Artificial Intelligence; pp. 77–82;1988.

Yoshida et al.; A Dynamic Scheduling for Flexible Manufacturing Systems; Hierarchical Control and Dispatching by Heuristics; 1989; pp. 846–852; Proceedings of the 28th Conference on Decision and Control.

*Primary Examiner*—Krisna Lim
*Attorney, Agent, or Firm*—Ratner & Prestia

[57] ABSTRACT

The present invention is embodied in a machine-implemented method of automatically correcting errors in an industrial schedule. The invention maintains a set of repair heuristics which may be applied to correct errors in the schedule. The system is initially trained by an expert who identifies problems in a set of trial schedules and applies the heuristics to correct the problems. The system records all steps, unsuccessful and successful, which were used by the expert to solve the problem. The recognized problem, the trial heuristics and the results of applying each heuristic are stored in a case library. When a sufficient number of trial schedules have been entered, the system may operate automatically. During automatic operation, the system automatically generates an initial schedule to solve a scheduling problem. Errors in the schedule are recognized either automatically or using input from an operator. Next, the case library is repeatedly searched for a solved case which most closely matches the present problem case and the previously successful heuristic is applied to solve the present problem until a solution is found. If no solution is found, the system takes the failed heuristics into account as a substitute for undefined contextual variables, which affect the schedule, in searching the case library.

6 Claims, 7 Drawing Sheets

CASE-BASED SCHEDULING METHOD FOR CREATING A SCHEDULE

This application is a continuation of patent application Ser. No. 08/037,080 filed Mar. 25, 1993 now abandoned.

BACKGROUND OF THE INVENTION

1. Field of the Invention

The present invention relates to scheduling systems, such as a factory scheduling system for an organization, which are used to assign resources with limited capacity to activities over time under several constraints such as prefixed partial ordering, while achieving the organization's objectives as much as possible.

2. Description of the Prior Art

So-called scheduling systems have been developed and used over the last several decades by the researchers and practitioners in the field of Operations Research (OR) and Artificial Intelligence (AI). In the beginning, researchers in OR developed several mathematical methods, such as Linear Programming, Integer Programming and Dynamic Programming, and tried to solve the scheduling problem by using those methods. Buts as the scheduling problem is proven to be a NP-hard problem, those mathematical methods failed to solve a large scheduling problem in a reasonable amount of time. To avoid the computationally expensive calculations inherent in these older OR techniques, heuristic simulation methods using sophisticated dispatching rules were developed and used to solve large scheduling problems. These methods have achieved great success in solving scheduling problems efficiently, and therefore they are still widely used all over the world. The details of those techniques developed in OR are described fully in many textbooks, such as "SEQUENCING AND SCHEDULING: An introduction to the Mathematic of the Job-Shop" by Simon French, Ellis Horwood, 1982.

The difficulty of scheduling problems is not solely caused by the size of the problem. The complexity of the constraints to be satisfied in the schedule can easily make scheduling intractable. For example, there may be precedence constraints connecting activities which specify which activities must precede which other activities, and by how much of a delay, or by how much allowed overlap. Or two particular activities may interfere with each other and be unable to use the same required resource simultaneously. Or it may not be possible to use two resources simultaneously during certain parts of the day or on the same activity. Or a resource may be unavailable during specified intervals due to planned maintenance or planned use outside the system. The above mathematical methods may be able to model those constraints precisely, but they can not find a solution in a timely way. And, the above heuristic dispatching methods don't have sufficient flexibility to model such complicated constraints. To overcome the difficulty, several scheduling systems have been developed by researches in AI, such as ISIS taught by Mark Fox. ISIS is the first scheduling systems that can model variety of constraints and find a schedule which satisfies those constraints in moderate time. After the success of ISIS, there appeared several scheduling systems which utilize rich representation capability of knowledge representation languages and efficient heuristic search techniques, which have been developed in the research of AI. These techniques are well known; see the description by Mark Fox in "Constraint-Directed Search: A Case Study of Job-Shop Scheduling", Pitman, London, 1987. The well known information about OR or AI techniques used in the scheduling problem is not repeated herein except as needed for one of ordinary skill in this art to understand the present invention.

The remaining difficulty of scheduling problems that is left unsolved until today is ambiguity and uncertainty involved in the scheduling problem. First, user's scheduling preferences are typically context dependent (e.g., may depend on the state of the scheduling environment at a particular time). Second interactions among preferences and effective tradeoffs often depend on the particular schedule produced. This means that generally a user cannot fully specify his/her preferences in advance and in the absence of particular scheduling results. Consider, for example, the situation where a user prefers using machine-b over a lower quality substitutable machine-a for processing order-x. This preference may be due to the desire to obtain high quality results for order-x since it belongs to a very important client. If, however, the schedule indicates that order-x is tardy by an amount above an acceptable tardiness threshold due to demands on machine-b (by orders more important than order-x), then, the user may decide to use the less preferable machine for order-x. On the other hand, if the tardiness was below the threshold, he/she may prefer to allow order-x to be tardy in exchange for producing a higher quality product. Nevertheless, to use the scheduling system developed so far, a user of the system is required to express his/her objectives of the schedule in a simple and clear way, which is usually very difficult for the user because of the above reasons. Third, factories are dynamic environments. Unexpected events, such as operator absence, power failure and machine breakdowns frequently happen. Therefore, it is necessary for the scheduling system to flexibly modify the schedule to take into account the changed planning context, which may have also caused changes in desired scheduling tradeoffs and preferences. Although initial progress has been made in schedule repair based on a static reactive model, there is the need for more flexible approaches. (See the detailed description in an article by Peng S. Ow et al. in "Reactive plan revision", Proceedings of Seventh American Association of Artificial Intelligence. pp 77–82, 1988.)

SUMMARY OF THE INVENTION

In this invention, user's interactions with the scheduling system are collected and stored in the storage device of a digital computer with additional sets of schedule context information, and the stored information is reused in later similar instances without any assistance from the user to emulate previous user's interactions. User's interactions to the scheduling system occur when a user can not be satisfied with the produced schedule and tries to modify it to his/her satisfaction. The user's interaction has two phases; one is when a user selects a defect to be repaired in the schedule and a repair method for it, and the other is when a user decides whether a repair result is acceptable or not. In the first phase, user's selections are stored along with several features of a schedule such as tardiness, resource utilization and so on, which provide information of the context where the selections are made. In the second phase, the user's decision is stored together with effects of the repair and his/her assignment of salience on each effect, which provide detailed information of his/her preferences in the given context. The rationale of this invention is that if the system can find a context in the memory which is similar to but not exactly the same the current context, the system can safely repeat the selection or decision, previously made by the user, in the current context to realize users' intention.

The present invention enables acquisition of context dependent user preferences and their reuse in schedule repair for improvement of the schedule quality based on user preference. Other applications of context dependent user preferences acquisition and their reuse for improvement of combinatorial optimization problems such as layout design and process planning are within the scope of the present invention.

BRIEF DESCRIPTION OF THE DRAWINGS

The present invention will become more fully understood from the detailed description given below and the accompanying drawings, throughout which like parts are designated by reference numerals, and wherein.

DETAILED DESCRIPTION OF THE PREFERRED EMBODIMENTS

Figure 1:
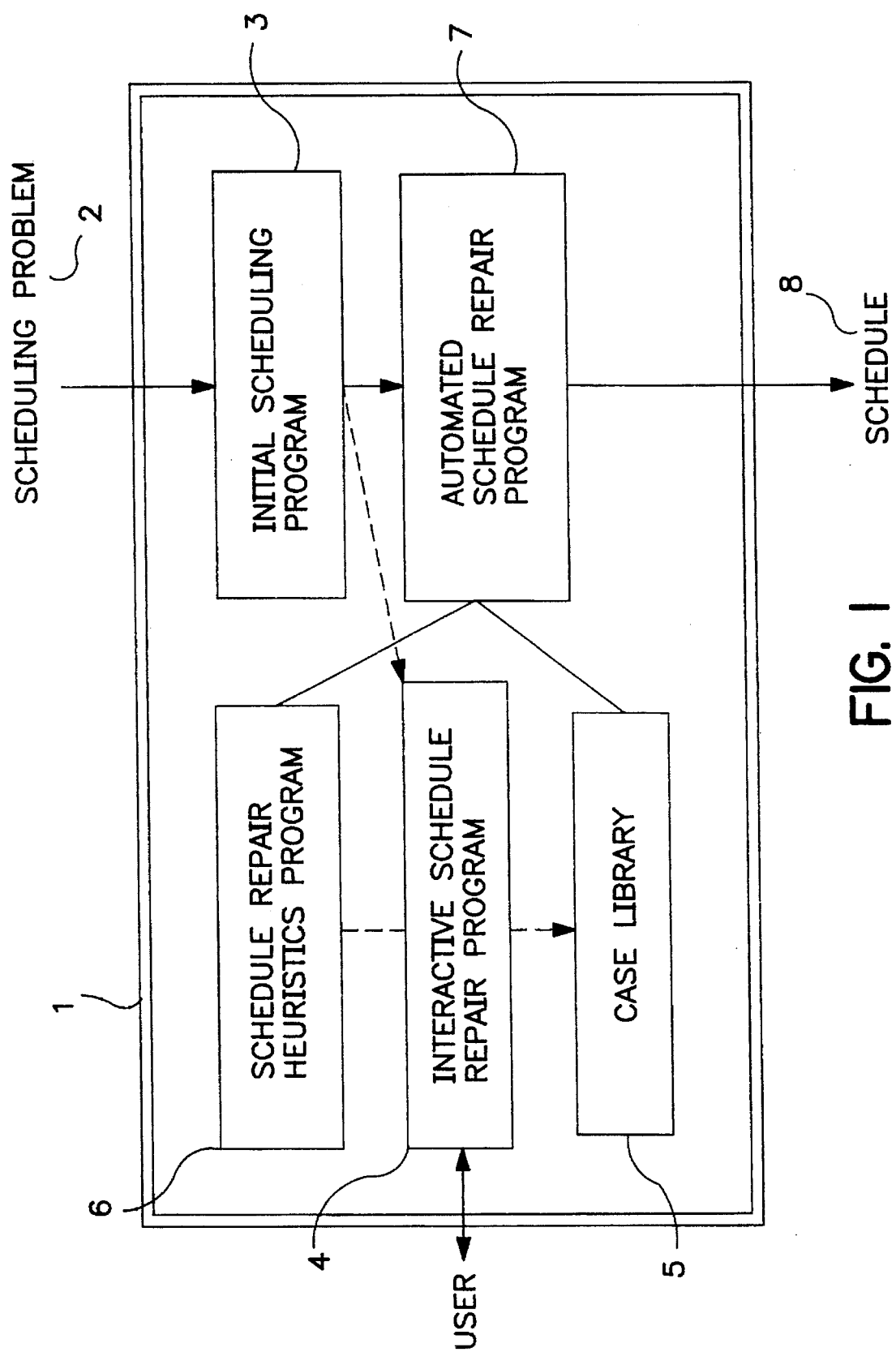
FIG. 1 is a simplified block diagram of a scheduling system according to an embodiment of the present invention.

Referring now to the drawings, there is shown in FIG. 1 a functional block diagram of an scheduling system according to the present invention. The invention is practiced in a digital computer, diagrammatically shown in the shaped line box 1 (hereafter computer 1). Scheduling problem 2 is a textual description of available resources, tasks to be achieved and constraints to be met. In a factory scheduling domain, resources are machines, operators and so on. Tasks are a combination of a product and its number to be manufactured. Some examples of constraints are physical constraints such as technical precedence of production and organizational constraints such as meeting a due-date of an order.

Given a problem, initial scheduling program 3 creates a solution to the problem. In the present invention, the method used for this initial scheduling is irrelevant. But, in the practical sense, a fast but poor dispatching method is best suited for this purpose, because it is very difficult to build an initial schedule with high quality when context-dependent user's preferences are not contained in either scheduling problem 2 or the initial scheduling program 3, and an initial schedule produced by initial scheduling program 3 receives repetitive modifications in the later stage for quality improvement.

In the present invention, context-dependent user's preferences are acquired by interactive schedule repair program 4 and stored in case library 5. A flow of context-dependent user's preferences is depicted as dashed lines in the FIG. 1. Interactive schedule repair program 4 receives an initial schedule of one of the trial scheduling problems from initial scheduling program 3. Then, interactive schedule repair program shows it to a user and if the user finds any defect in the schedule, the user selects one of the heuristics stored in schedule repair heuristics program 6. Interactive schedule repair program 4 applies the selected heuristics to the schedule and shows the result to the user. The user judges whether the resultant schedule is acceptable or not. This cycle is repeated until the user finds no more defects to be repaired in schedule. These interactions between the interactive schedule repair program 4 and the user together with the schedule features in which interaction occurred are recorded in case library 5. The more detailed flow of user's preferences acquisition are explained below. When a sufficient number of the records are stored in case library 5, an initial schedule made by the initial scheduling program 3 can be repaired by an automated schedule repair program 7 without any help from the user. A flow of this automated schedule repair is depicted as solid lines in the FIG. 1. Automated schedule repair program 7 receives an initial schedule from initial scheduling program 3. Then, automated schedule repair program 7 finds a defect to be repaired and repairs it by applying appropriate heuristics in the schedule repair heuristics program 6. These heuristics are selected according to the stored records in case library 5. This cycle is repeated until automated schedule repair program can find no more defects to be repaired. When no more repair is possible or desirable, the result is output as schedule 8. This process is of central importance in the present invention, so, much more details of this process will be revealed later.

Figure 2:
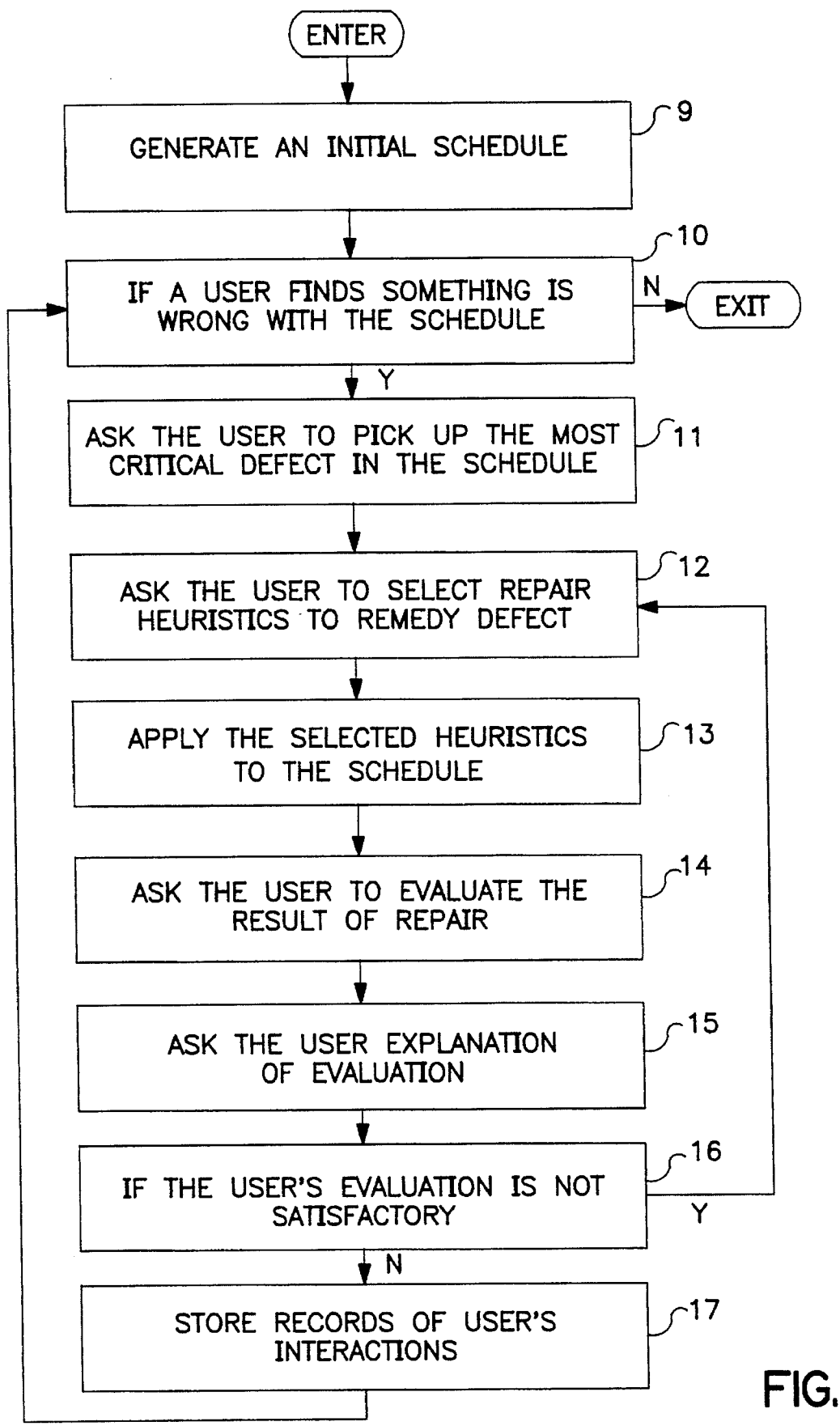
FIG. 2 is a simplified flow chart illustrating case library construction process employed in the FIG. 1 illustrated system.

FIG. 2 is a flow chart of the process of acquiring context-dependent user's preferences, which was described briefly above. After initial scheduling program 3 generates an initial schedule referring to a given trial scheduling problem 2 (step 9), interactive schedule repair program 4 shows the result of the initial scheduling to the user by several means such a graphical Gantt-chart display and tables of various numerical evaluations (e.g., average order tardiness or resource utilization).

If the user doesn't find any defect in the schedule, the process is terminated (step 10). If the user finds some defects to be repaired (step 10), the user is asked to select one defect among them as the most critical defect to be repaired first (step 11). When the defect to be repaired is determined, the user is asked to select one repair heuristics among several to remedy the selected defect in the schedule (step 12). When the repair heuristics is decided, the heuristics is applied to repair the schedule (step 13). Then, the result of applying the repair heuristics is shown to the user and evaluated by the user as acceptable or not (step 14). Then, the user is requested to explain the judgment by enumerating favorable and unfavorable effects with their subjective criticality (step 15) If the user finds that the result of repair is unacceptable (step 16), the user is asked to try another repair heuristics or give up repairing the defect (step 12). At the end of this cycle, every user's decision, user's explanation about the evaluation to the repair result and several numerical evaluations of the repaired schedule as contextual information are stored as a record in case library 5 (step 17).

Figure 3:
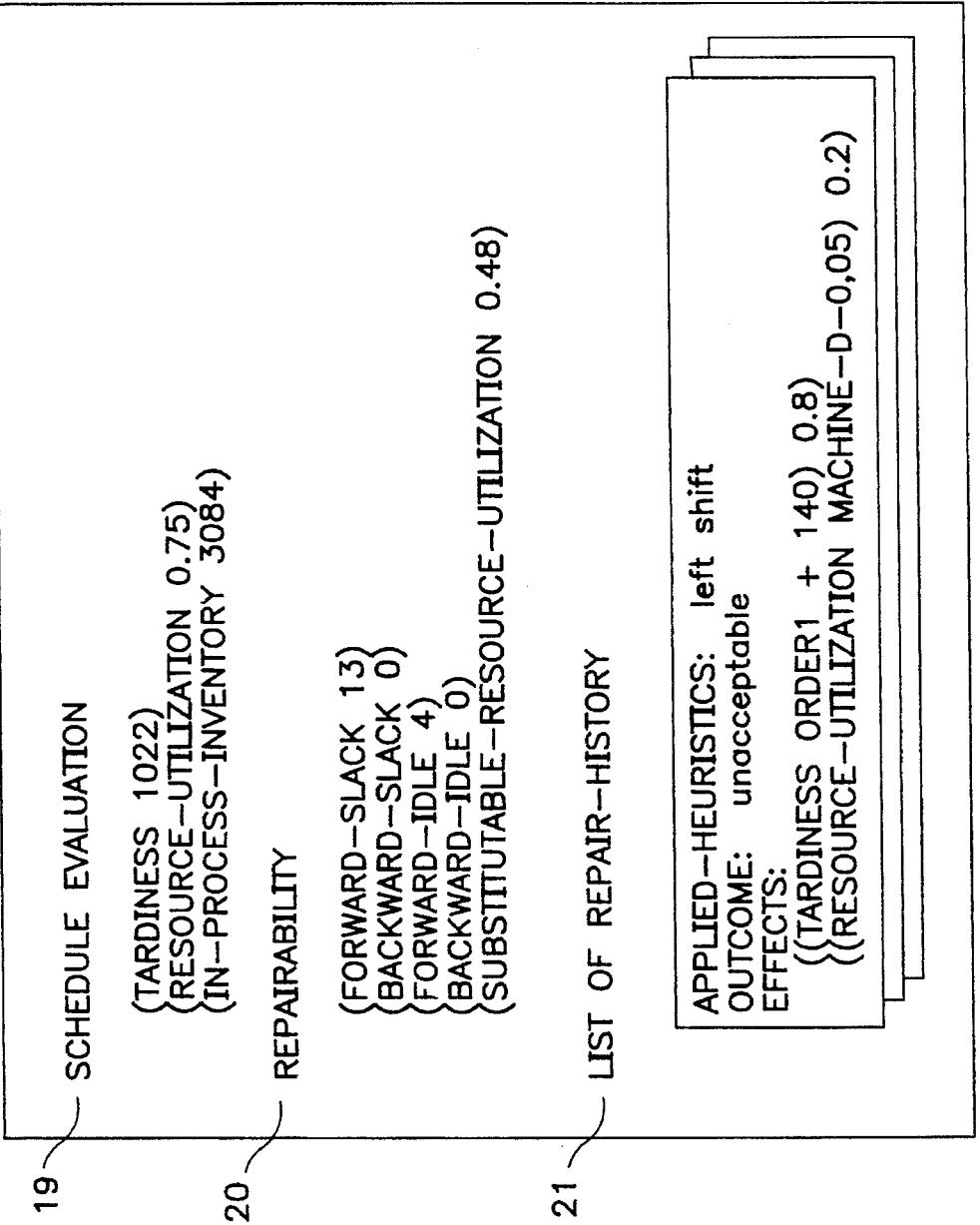
FIG. 3 is a simplified but detailed showing of an example of the data stored in the case library in the FIG. 1 illustrated system.

In case library 5, records of user's interactions might be stored in a number of forms such as linear list or hierarchical network. The methods of record storage are known to make a big difference in the efficiency of record retrieval, but it is irrelevant to the present invention in terms of its qualitative achievement. FIG. 3 shows the content of an exemplary record stored at the end of process of acquiring context-dependent user's preferences, described above. All interactions during repair of one defect along with other contextual information are stored as one record diagrammically shown in the solid line box 18.

In one record, two kinds of contextual information are stored: schedule evaluation 19 and repairability 20. In schedule evaluation 19, the global contextual values which represent global features of the overall schedule such as job timeliness, resource idleness and inventory size are calculated and stored. In repairability 20, more local contextual values around the selected defect to be repaired are calculated and stored. These may represent, for example, the ease or difficulty of curing a defect, such as slacks in the precedence constraint, idleness in the assigned resource and availability of a substitutable resource.

To acquire user's preferences, user's interactions during interactive repair are recorded in list of repair-history 21. In list of repair-history 21, user's interactions during a single trial of repairing a defect are stored in a single repair-history record. In a repair-history record, stored user's decisions at repair are: (1) applied-heuristics: repair heuristics selected by the user to repair the defect, (2) outcome: user's judgement on the acceptability of repaired schedule quality and (3) effects: all effects of the repair which the user thinks important are enumerated with their criticality assigned subjectively by the user. The list of this repair-history shows the user's repair sequence, which is a succession of several failures and lastly one or no success. The reason that a series of user's repair trials is recorded and not just the last trial is explained below.

Figure 4:
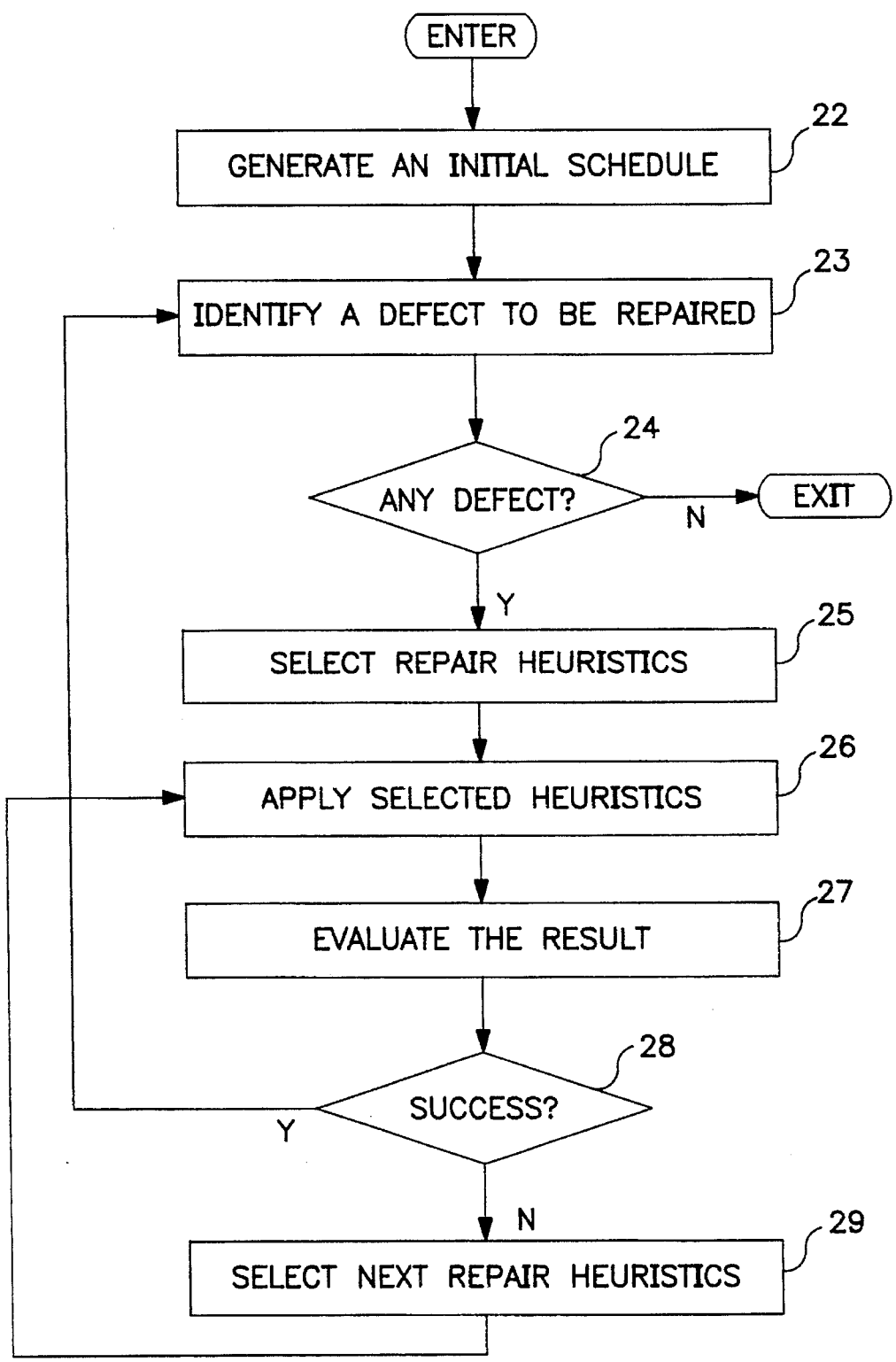
FIG. 4 is a simplified flow chart illustrating automated schedule repair process employed in the FIG. 1 illustrated system.
Figure 5:
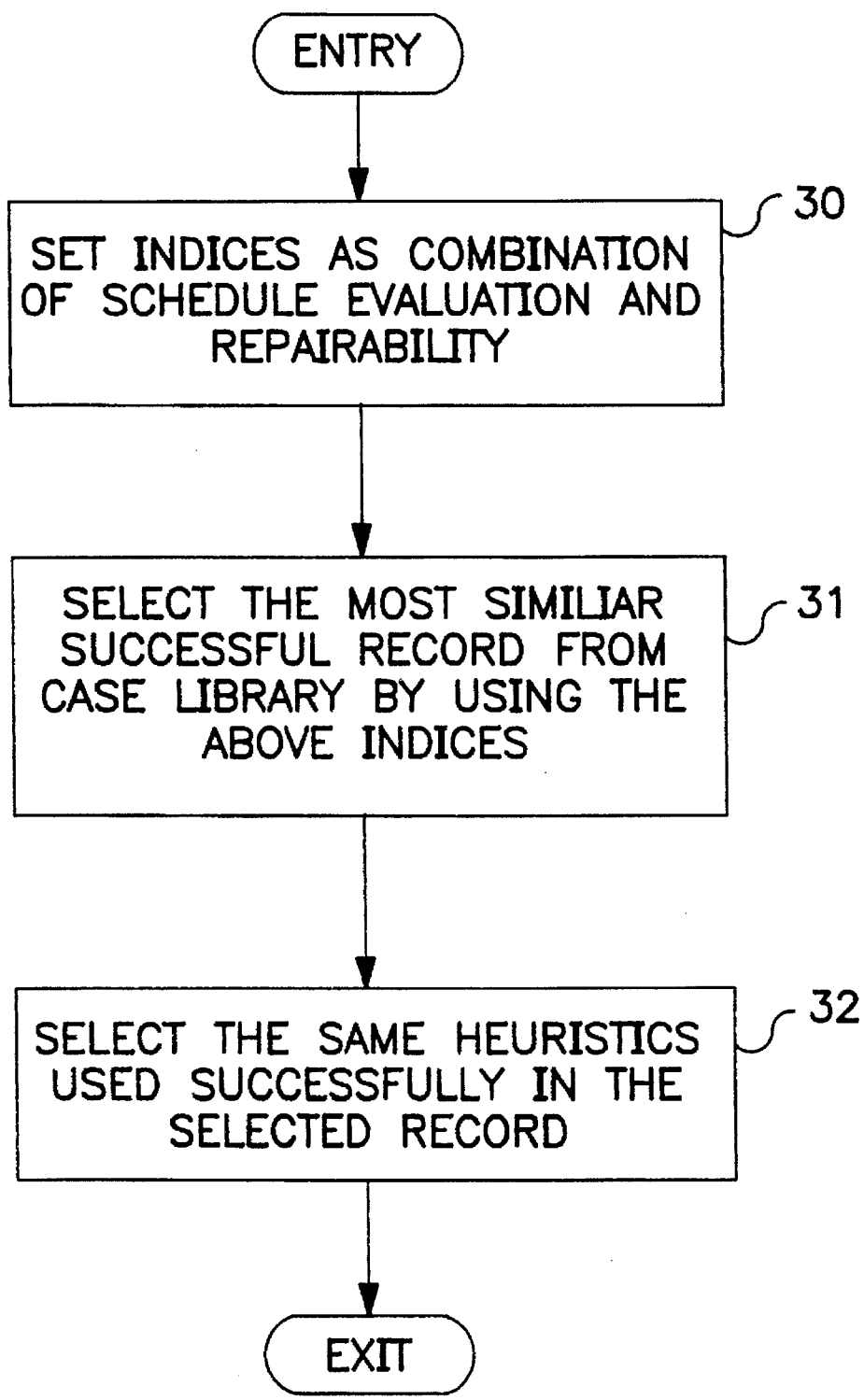
FIG. 5 is a simplified flow chart illustrating repair heuristics selection process employed in the FIG. 4 illustrated process.

FIG. 4 is a flow chart of the automated schedule repair process described briefly above. When enough records are stored in case library 5, the present invention can substitute for a human user in repairing a schedule for better quality. First, an initial schedule is generated by initial scheduling program 3 (step 22). In the given schedule, one of the most critical defects is identified to be repaired (step 23). This can be done with the assistance of a human user or by a computer program which is coded based upon user's criticality measures of scheduling defects when a user can specify them. If no defect to be repaired is identified (step 24), this process is terminated. Otherwise, the applied heuristic used in the most similar successful record in case library 5 is selected as the repair heuristics to be applied. FIG. 5 shows a more detailed flow chart of step 25. In retrieving the most similar record to the current schedule, items of schedule evaluation 19 and repairability 20 in a schedule repair record 18 are used as indices (step 30). Similarity between a record in case library 6 and current schedule is calculated on those indices (i) and the most similar record which was successfully repaired at the end of its repair-history is selected (step 31). The similarity is calculated as follows:

$$\text{similarity} = \exp\left(-\text{sqrt}\left(\sum_i \left(\frac{\text{record\_value}_i - \text{problem\_value}_i}{\text{standard\_deviation}_i}\right)^2\right)\right),$$

where record_value is a value of an indexed feature in a record, problem_value is a value of the same feature in the current schedule, standard_deviation is a value of standard deviation of the indexed feature value of all records stored in case library 5 and sqrt(x) indicates the square-root of x. Once the most similar successful record in case library 5 is retrieved, the repair heuristic which was applied successfully in the record is selected (step 32).

Returning to FIG. 4, when a repair heuristics is selected, it is applied to the current schedule (step 26). The outcome of the past repair-history 21 with the most similar effects to the current result is considered to be same as a judgment on the acceptability of the current repaired result (step 27).

Figure 6:
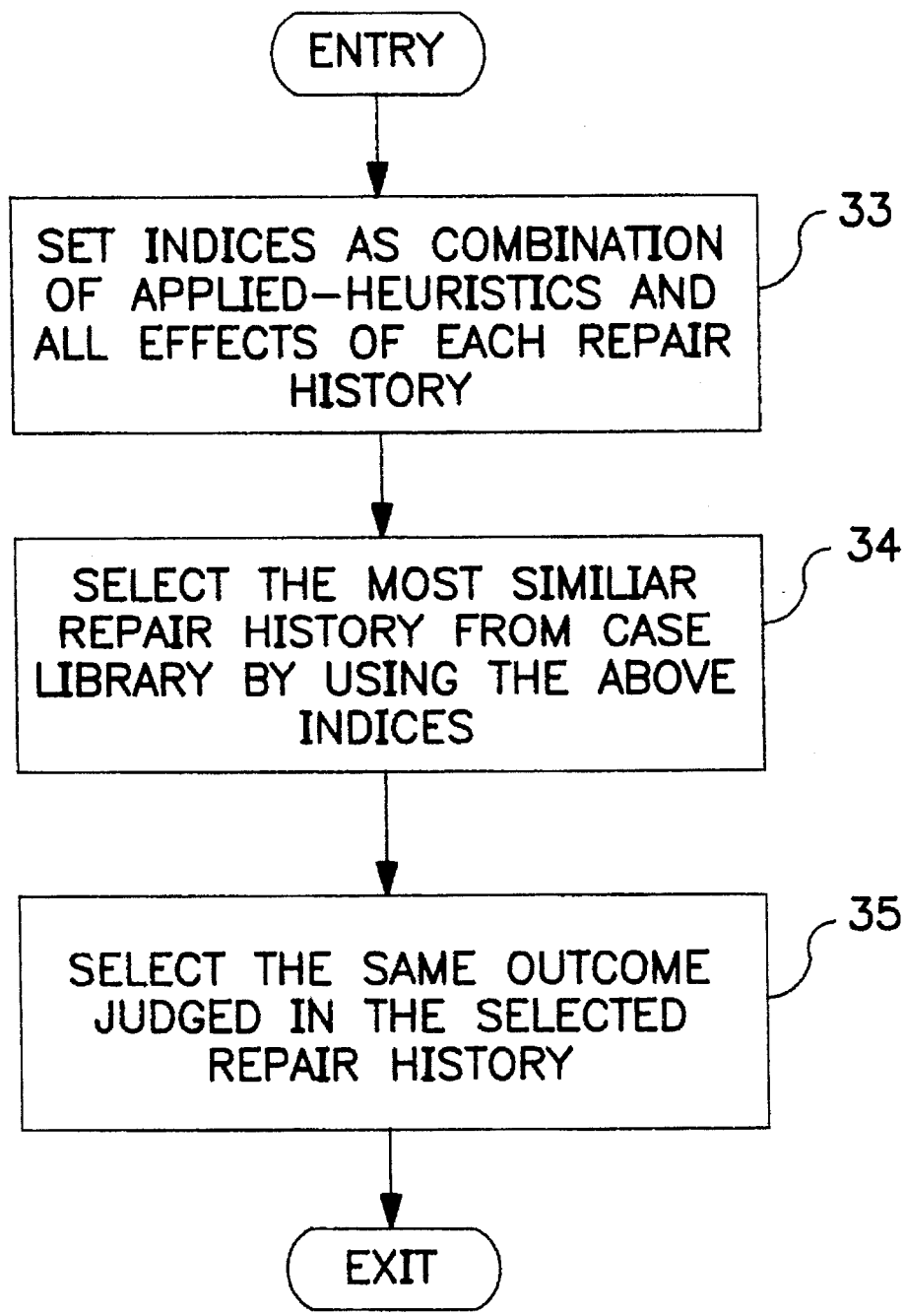
FIG. 6 is a simplified flow chart illustrating repair result evaluation process employed in the FIG. 4 illustrated process.

FIG. 6 shows a more detailed flow chart of step 27. In retrieving the repair result in the past records which is most similar to the current repair result, items of applied-heuristics and effects in list of repair-history 21 of a schedule repair record 18 are used as indices (step 33). Similarity between each record in case library 5 and current schedule is calculated on those indices and the most similar repair-history is selected (step 34). The similarity is calculated in the same manner as above. Once the most similar repair-history in case library 5 is retrieved, the outcome judged in the repair-history is selected (step 35).

Returning to FIG. 4, if the derived outcome is "acceptable" (step 28), the next most critical defect to be repaired is identified (step 23). If the outcome is "unacceptable" (step 28), another repair heuristics is selected from the most similar successful record in case library 5 (step 29).

Figure 7:
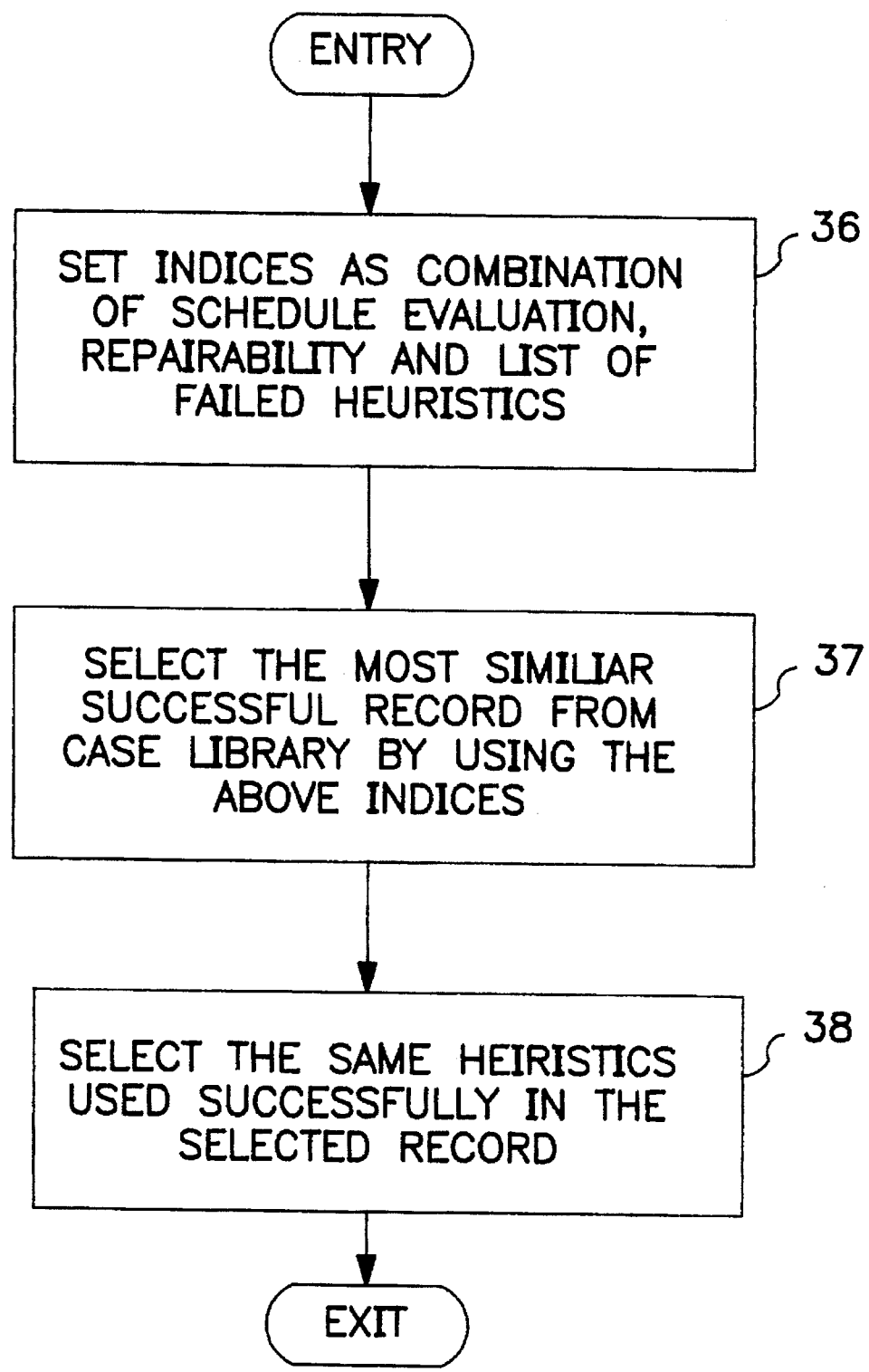
FIG. 7 is a simplified flow chart illustrating repair heuristics re-selection process employed in the FIG. 4 illustrated process.

FIG. 7 shows a more detailed flow chart of step 29. In retrieving the most similar record to the current schedule, items of schedule evaluation 19, repairability 20 and failed applied-heuristics in the list of repair-history 21 of a schedule repair record 18 are used as indices (step 36). The information in repair-history on the failures of applying certain heuristics on a given schedule is supposed to give deeper insight of the context of the schedule, which can not be supplied by the surface information such as schedule evaluation 19 and repairability 20. Similarity between a record in case library 5 and current schedule is calculated based on those indices, and the most similar record which was successfully repaired at the end of its repair-history is selected (step 37). The calculation of similarity is same as above. Once the most similar successful record in case library 5 is retrieved, the repair heuristics applied successfully in the record is selected (step 38).

Although the present invention has been fully described by way of examples with references to the accompanying drawings, it is to be noted here that various changes and modifications will be apparent to those who skilled in the art. Therefore, unless such changes and modifications otherwise depart from the spirit and scope of the present invention, they should be constructed as being included therein.

What is claimed:

1. In a machine-effected method of creating a schedule to a given schedule problem, which has to satisfy the constraints and maximize a user's objectives in the schedule that are or are not described explicitly in the schedule problem;

the machine-executed steps of:
   first, acquiring and recording the user's context dependent preferential knowledge for scheduling, in a case library, by solving trial schedule problems with extensive assistance of a user, said case library including schedule evaluation information, repairability information, and repair history information;
   second, solving new schedule problems by reusing the recorded user's context dependent preferential knowledge stored in said case library in the decision points of the new schedule problems.

2. In the machine-effected method set forth in claim 1 wherein said context dependent user's decisions are acquired:

further including the machine-executed step of:

recording the user's context dependent preferential knowledge as a repair record of solving the trial schedule problems by iterative repair in said case library, together with said schedule evaluation information which includes global features of the schedule; said repairability information which includes local features around the defect to be repaired and said repair-history information which includes a combination of the applied repair heuristics, the repair results and effects of repair which are important changes occurring in the schedule at an iteration of a repair and their subjective salience from user's point of view.

3. In the machine-effected method set forth in claim 1 wherein said context dependent user's preferential knowledge recorded in repair records in said case library are reused to solve a new schedule problem;

further including the machine-executed steps of:

first, repairing a defect in a solution of said new schedule problem by selecting a repair heuristics in a schedule repair heuristics program based on the most similar one of said repair records stored in said case library by using an automated schedule repair program and applying the selected repair heuristics to the schedule to obtain a repair result;

second, judging acceptability of the repair result based upon the most similar one of said repair records stored in said case library by using said automated schedule repair program;

third, when the repair result is judged unacceptable, selecting a next repair heuristics based on the most similar one of said repair record stored in said case library by using said automated schedule repair program.

4. In the machine-effected method set forth in claim 3 wherein the most similar one of said repair records is retrieved from said case library to select a repair heuristics to remedy a given defect and wherein said repair record includes the schedule evaluation information and the repairability information and said repair heuristics;

further including the machine-executed steps of:

first, selecting said schedule evaluation information and said repairability information in said repair record as indexed values;

second, calculating similarity of the current schedule to said repair record using said indexed values;

third, retrieving the most similarly said repair record based on the calculated similarity;

fourth, selecting the successfully applied repair heuristics from said repair-history of the retrieved said repair record.

5. In the machine-effected method set forth in claim 3 wherein the most similar one of said repair record is retrieved from said case library to judge the acceptability of the repaired schedule and wherein said repair record includes said repair history information including the applied repair heuristics and the outcome of said repair record;

further including the machine-effected steps of:

first, selecting the applied repair heuristics and the effect of the repair in said repair history information of said repair record as indexed values;

second, calculating from the indexed values, a similarity of the current schedule to said repair history;

third, retrieving the most similar one of said repair history information;

fourth, selecting the outcome of the retrieved said repair history.

6. In the machine effected method set forth in claim 3 wherein the most similar one of said repair records is retrieved from said case library to select a next repair heuristics to remedy a given defect upon a failure of previous repair attempts and wherein said repair record includes said schedule evaluation information and said repairability information and said repair history information;

further including the machine-executed steps of:

first, selecting said schedule evaluation information and said repairability information and said repair history information in said repair record as indexed values;

second, calculating, from the indexed values, a similarity of the current schedule to said repair record;

third, retrieving the most similar one of said repair records;

fourth, retrieving the successfully applied repair heuristic in said repair-history information of the selected repair record.

* * * * *